United States Patent [19]
Kinkelaar et al.

[11] Patent Number: 5,668,191
[45] Date of Patent: Sep. 16, 1997

[54] ONE-SHOT COLD MOLDED FLEXIBLE POLYURETHANE FOAM FROM LOW PRIMARY HYDROXYL POLYOLS AND PROCESS FOR THE PREPARATION THEREOF

[75] Inventors: Mark R. Kinkelaar, Cross Lanes; Frank E. Critchfield, South Charleston; James L. Lambach, Charleston, all of W. Va.

[73] Assignee: ARCO Chemical Technology, L.P., Greenville, Del.

[21] Appl. No.: 576,429

[22] Filed: Dec. 21, 1995

[51] Int. Cl.$^6$ ................................................ C08G 18/32
[52] U.S. Cl. ........................................... 521/174; 521/176
[58] Field of Search .................................. 521/174, 176

[56] References Cited

U.S. PATENT DOCUMENTS

| | | | |
|---|---|---|---|
| 2,948,691 | 8/1960 | Windemuth et al. | 260/2.5 |
| 3,026,275 | 3/1962 | Muller et al. | 260/2.5 |
| 3,042,631 | 7/1962 | Strandskov | 260/2.5 |
| 4,477,589 | 10/1984 | van der Hulst et al. | 502/169 |
| 4,579,700 | 4/1986 | Cavender | 264/46.4 |
| 4,690,955 | 9/1987 | Kilgour et al. | 521/112 |
| 4,717,518 | 1/1988 | Cavender | 264/51 |
| 5,010,117 | 4/1991 | Herrington et al. | 521/159 |
| 5,070,114 | 12/1991 | Watts et al. | 521/159 |
| 5,093,380 | 3/1992 | Takeyasu et al. | 521/131 |
| 5,100,922 | 3/1992 | Wada et al. | 521/51 |
| 5,100,997 | 3/1992 | Reisch et al. | 528/60 |
| 5,106,874 | 4/1992 | Porter et al. | 528/64 |
| 5,158,922 | 10/1992 | Hinney et al. | 502/175 |
| 5,171,759 | 12/1992 | Hager | 521/112 |
| 5,248,833 | 9/1993 | Hinney et al. | 568/621 |
| 5,250,582 | 10/1993 | Hire et al. | 521/157 |
| 5,278,274 | 1/1994 | Verhelst et al. | 528/44 |
| 5,300,535 | 4/1994 | Takeyasu et al. | 521/137 |
| 5,549,841 | 8/1996 | Kinkelark et al. | 521/174 |
| 5,596,059 | 1/1997 | Hager et al. | 521/175 |
| 5,605,939 | 2/1997 | Hager | 521/137 |

FOREIGN PATENT DOCUMENTS

| | | |
|---|---|---|
| 2088521 | 4/1993 | Canada . |
| 0480588 | 4/1992 | European Pat. Off. . |

OTHER PUBLICATIONS

"Continuous Prepolymers", Liz White, Urethanes Technology Feb./Mar., 1995; p. 9.
Chemical Abstracts, 12899–900, vol. 64, 1966.
"Properties of Flexible Urethane Foams", J.H. Saunders, et al, Chemical and Engineering Data Series, vol. 3, No. 1, 1958, pp. 153–161.
"Preparation of Urethane Polymers", H.L. Heiss, et al, Industrial and Engineering Chemistry, vol. 51, No. 8, Aug. 1959, pp. 929–934.
"Behavior of Isocyanate–Terminated Prepolymers in the Presence of Various Catalysts", J.W. Britain, I&EC Product Research and Development, vol. 1, No. 4, Dec. 1962, pp. 261–264.
Rubber Chemistry and Technology—Urethan Foams, J.H. Saunders 1960, pp. 1296–1301.
"Properties of a Semiflexible Urethane Foam System", R.L. Sandridge, et al Journal of Chemical and Engineering Data, vol. 5, No. 4, Oct. 1960, pp. 495–498.
"Urethane Polyether Prepolymers and Foams", H.G. Scholten, et al, Journal of Chemical Chemical and Engineering Data, vol. 5, No. 3, Jul., 1960, pp. 395–400.
"Molding of Prepolymer Bassed Resilient Urethane Foam", R.E. Knox, Rubber World, pp. 685–692, Feb. 1959.
Polyurethanes—Chemistry and Technology, J.H. Saunders and K.C. Frisch, Interscience Publishers, New York, NY, pp. 43, 65, and 99.
"Production of Soft Block Foams and TDI–Based Cold Cure–Molded Foams with No Use of CFCs", G.F. Lunardon, et al, 32nd Annual Polyurethane Technical Marketing Conference, Oct. 1–4, 1989, pp. 239–245.
Polyurethanes Chemistry & Technology, Part II–Tech., Saunders and Frisch, Wiley, 1964, pp. 38–43.
"Continuous Processing of Urethane Foam Prepolymers", J.R. Wall, Chemical Engineering Progress, vol. 57, No. 10, Oct. 1961, pp. 48–51.
"New Dynamic Flex Durability Test 1", K.D. Cavender, 33rd Annual Polyurethane Technical/Marketing Conference, Sep. 30–Oct. 3, 1990, pp. 282–288.
"Real Time Foam Performance Testing", K.D. Cavender, 34th Annual Polyurethane Technical/Marketing Conference Oct. 21–24, 1992, pp. 260–265.
"Urethane Applications for Novel High Molecular Weight Polyols", R.L. Mascioli, 32nd Annual Polyurethane Technical/Marketing Conference, Oct. 1–4, 1989, pp. 139–142.
"Polyurethane Sealants and Cast Elastomers with Superior Physical Properties", J.W. Reisch and D.M. Capone, 33rd Annual Polyurethane Technical/Marketing Conference, Sep. 30–Oct. 3, 1990, pp. 368–374.
"Standard Methods of Testing Urethane Foam Polyol Raw Materials" ASTM Designation No.: D 2849–69.

*Primary Examiner*—Morton Foelak
*Attorney, Agent, or Firm*—Dennis M. Kozak

[57] ABSTRACT

Cold molded flexible polyurethane foams may be prepared from low primary hydroxyl Polyoxyalkylene polyols when polyoxyalkylene polyols having an unsaturation of 0.02 meq/g or less provide the substantial portion of the polyol component.

20 Claims, No Drawings

ONE-SHOT COLD MOLDED FLEXIBLE POLYURETHANE FOAM FROM LOW PRIMARY HYDROXYL POLYOLS AND PROCESS FOR THE PREPARATION THEREOF

TECHNICAL FIELD

The present invention pertains to cold molded polyurethane foam. More particularly, the present invention pertains to cold molded polyurethane foam prepared by reacting a di- or polyisocyanate component with a polyol component comprising, in substantial part, one or more polyoxypropylene/polyoxyethylene random copolymer polyols having a primary hydroxyl content of less than 50 mol percent and an unsaturation of less than about 0.02 meq/g polyol.

BACKGROUND ART

Polyurethane flexible foams are well known commercial products with a myriad of uses. The majority of such polyurethane flexible foams may be roughly divided into three art-recognized divisions: free rise slab foam; hot molded foam; and cold molded foam. In addition, each of these broad categories may be further subdivided into one-shot foams and prepolymer foams.

Free rise slab foam constitutes the largest production of polyurethane foam. In free rise slab foam, the reactive ingredients flow from a mixhead onto a moving conveyor where the foam is allowed to rise freely. In high resilience slab foam, the formulation typically contains one or more di- or polyisocyanates, generally toluene diisocyanates (TDI); a polymer polyol containing a dispersed polymer particle phase in a continuous polyol phase, the latter being an oxyethylene-capped polyoxypropylene polyether polyol containing in excess of 50 mol percent primary hydroxyl groups; a low molecular weight chain extender/cross-linker, generally diethanolamine; a polyether silicone foam-stabilizing surfactant; amine and tin catalysts; and an amount of water as a reactive blowing agent effective to provide the desired target foam density.

Slab foam is predominantly open celled, and once prepared, is generally sliced to suitable thickness for the desired end use: carpet underlay, furniture seat cushions, weather stripping, packaging materials, and the like. However, foam products derived from slabstock are generally limited to planar products. Thus, slabstock foam is unsuitable for applications such as contoured seating cushions, particularly automotive seating, arm rests, head rests, vehicle dashboards, and the like. For these applications, molded polyurethane foam must be utilized.

Hot molded polyurethane foam is prepared by injecting the polyurethane reactive formulation into a vented mold which is then placed into a curing oven. The mold is generally heated prior to introduction of the foam formulation, is cured at considerably elevated temperature, and remains at an elevated temperature during demolding, which creates a safety problem due to the possibility of human contact with the hot mold. The time required to cure the polyurethane foam product requires that numerous identical and expensive molds be used for high volume production. As the foam is slow curing, a considerable amount of foam escapes from the mold vents during foaming, and thus represents a considerable waste of raw materials. The hot molding process is quite energy intensive.

Due to the deficiencies of the hot molded foam process, cold molded polyurethane foam has largely supplanted hot molded foam in the United States, although hot molding is still widely practiced in Europe and the Pacific Rim. In cold molding, the reactive polyurethane formulation is introduced into a mold, generally at modestly elevated temperature, for example 150° F. (66° C.), and demolded after a curing cycle of only about 2 to 5 minutes, without in-mold oven cure. Following demold, cell opening is accomplished by crushing, or the cell opening may be done in the mold through use of timed pressure release (TPR) or timed partial pressured release (TPPR), or combinations of these techniques with modest mechanical crushing. The foam is generally then cured at elevated temperature. The cold molding process enables rapid production with a limited number of molds; largely obviates the potential of burns due to the lower mold temperature; and uses substantially less raw materials due to a much smaller amount of foam exuding from the mold vents, which are also typically much smaller than those employed in hot molding.

However, the benefits of cold molding are partially offset by increases in the cost of the foam formulation ingredients. The isocyanate and polyol components must react in a short time to provide high productivity in cold molding. One method of providing short reaction times in the cold molding process is to employ isocyanate terminated prepolymers in which a substantial portion of total polyol is essentially "prereacted". Moreover, prepolymer systems offer the foam producer a "pre-tested" formulation generally involving fewer reactive components, thus lowering the scrap rate, which may be offset by higher raw material costs in some instances. Many foam producers continue to specify one-shot systems, however.

In one-shot systems, in order to achieve the necessary reactivity of the isocyanate and polyol components, it has been necessary to employ polyoxyalkylene polyols having a high primary hydroxyl content, for example greater than 70 mol percent and generally greater than 80 mol percent, whether used as such, or as the continuous phase of a polymer polyol component. The high primary hydroxyl content is necessary to provide rapid cure through reaction with the isocyanate component. Use of low primary hydroxyl polyols leads to foam collapse in cold molded foams. When the polyether polyol of the polyol component or the base polyol of a polymer polyol portion of the polyol component are prepared by base catalyzed oxyalkylation, providing a high primary hydroxyl content merely involves capping a predominantly polyoxypropylene polyol with oxyethylene moieties by introduction of ethylene oxide alone during the last stage of the oxyalkylation. By employing approximately 15–25 weight percent ethylene oxide based on the total polyol weight in the capping phase of the oxyalkylation, primary hydroxyl contents of from 70 mol percent to in excess of 90 mol percent may be obtained. However, the high proportion of relatively hydrophilic terminal polyoxyethylene moieties can adversely affect foam properties, particularly humid aged compression set and wet set.

In the 1960's, double metal cyanide complex catalysts were introduced for oxypropylation. One of the benefits of such catalysts is the relatively low levels of unsaturation introduced into the polyol product through the rearrangement of propylene oxide into allyl alcohol and the subsequent oxypropylation of this monofunctional species. Measurement of unsaturation is generally considered reflective of the monol content of the polyoxyalkylene polyol product. With double metal cyanide complex catalysis, unsaturations in the range of 0.017 to 0.020 meq/g were achieved, as compared to normal, base-catalyzed unsaturations in the range of 0.035 to 0.12 meq/g, measured in accordance with ASTM D-2849-69 "Testing Urethane Foam Polyol Raw Materials." The latter value reflects a concentration of monol of from 40 mol percent to in excess of 50 mol percent, as a result of which the measured, actual functionality of the polyol is considerably lower than the theoretical, or "nominal" functionality which is the same as the initiator functionality. However, despite the advantages of double metal cyanide complex catalysts in lowering unsaturation and monol content, the cost/activity ratio of such catalysts coupled with the necessity to purify the polyol product to eliminate the difficulty removable catalyst residues prevented successful commercialization. Improvement in catalyst A activity, as illustrated by U.S. Pat. No. 5,158,992, heightened prospects of commercialization, as well as providing yet lower unsaturation, in the range of 0.015 to 0.018 meq/g. However, removal of catalyst residues still posed a problem.

Most recently, however, the ARCO Chemical Company has developed new double metal cyanide complex catalysts with much higher catalytic activity and unprecedented low levels of unsaturation, the latter in the range of 0.003 to 0.007 meq/g. The use of lower levels of catalysts coupled with higher polyoxyalkylation rates and the use of simple filtration to remove catalyst residues has resulted in commercialization of double metal cyanide complex-catalyzed polyoxypropylene and random polyoxypropylene/polyoxyethylene copolymer polyols.

However, in order to prepare double metal cyanide complex-catalyzed polyols having high primary hydroxyl content, it has thus far been found necessary to prepare the high primary hydroxyl polyoxyethylene cap in the presence of traditional basic catalysts such as potassium hydroxide. Following initial preparation of an all propylene oxide-derived polyol or a random propylene oxide/ethylene oxide-derived polyol by double metal cyanide complex catalysis, basic catalyst is added which destroys, deactivates, or denatures the double metal cyanide catalyst and provides the requisite basic catalyst level necessary for oxyethylene group capping. The polyol product must then be treated to remove basic catalyst residues in the conventional manner.

The process just described is wasteful of double metal cyanide complex, which, if not denatured, can sometimes be reused, and further requires conventional polyol finishing steps to remove basic catalyst, adding to processing time and expense. If ethylene oxide addition is attempted with double metal cyanide complex catalysts without addition of basic catalysts, however, a complex mixture believed to contain considerable quantities of homopolyoxyethylene polymers rather than an oxyethylene capped product are obtained. Thus, the benefits of using double metal cyanide complex-catalyzed polyols in formulations requiring high primary hydroxyl content polyols have not been realized.

SUMMARY OF THE INVENTION

It has now been surprisingly discovered that cold molded flexible polyurethane foams may be prepared in a one-shot process without employing a high primary hydroxyl polyol component, provided that a substantial majority of the polyol component comprises one or more polyoxypropylene/polyoxyethylene random copolymers having a primary hydroxyl content of less than about 50 mol percent and an unsaturation of less than 0.02 meq/g. Such polyols have been unexpectedly been found to be able to produce good quality polyurethane foams despite their low primary hydroxyl content, whereas base-catalyzed polyol having similar, low primary hydroxyl content result in foam collapse.

DESCRIPTION OF PREFERRED EMBODIMENTS

The polyoxyalkylene polyols useful in the subject invention are essentially random polyoxypropylene/polyoxyethylene copolymer polyols which may have primary hydroxyl contents of less than about 50 mol percent, generally less than about 40 mol percent, for example in the range of about 20 to 35 mol percent, and unsaturations of less than about 0.020 meq/g, preferably less than 0.015 meq/g, more preferably less than 0.010 meq/g, and particularly about 0.007 meq/g or less.

The polyoxyalkylene, low primary hydroxyl polyols of the subject invention may be prepared by any method of catalysis which results in the above ranges of primary hydroxyl content and unsaturation. However, it is preferable to employ double metal cyanide complex catalysts such as those disclosed in U.S. Pat. No. 5,158,922 and particularly U.S. Pat. No. 5,470,813.

The polyols of the subject invention are prepared by oxyalkylating a suitably hydric initiator molecule with propylene oxide alone, a mixture of propylene oxide and a higher alkylene oxide such as 1,2- or 2,3-butylene oxide, or a mixture of any of the foregoing alkylene oxides with ethylene oxide. The composition of the alkylene oxide feed may change during the course of oxyalkylation to produce a variety of random and block/random polyol configurations. For example, initial oxyalkylation may be performed exclusively with propylene oxide following which a mixture containing both propylene oxide and ethylene oxide is employed. The resulting polyol would, in such case, contain an internal polyoxypropylene block and an external random polyoxypropylene/polyoxyethylene block.

In the case where low unsaturation-producing, non-double metal cyanide complex catalysts are utilized, an initial oxyalkylation with propylene oxide or a mixture of propylene oxide and ethylene oxide may be followed by oxyalkylation with a minor proportion of all ethylene oxide, for example less than 10% by weight of the polyol product, to prepare a polyol containing a considerable amount of random oxypropylene/oxyethylene end caps and a small proportion of polyoxyethylene end caps such that the total primary hydroxyl content is less than 50 mol percent. Such polyols are considered "random" polyoxypropylene/polyoxyethylene polyols as defined herein due to the relatively small amount of polyoxyethylene end caps and limited primary hydroxyl content resulting therefrom.

However, it is preferable to employ double metal cyanide complex catalysts. When employing such catalysts, it has been found that the induction period associated with such catalysts can be minimized when oligomeric oxyalkylated initiator molecules are utilized in lieu of low molecular weight "monomeric" initiator molecules. Such oligomeric initiator molecules may be prepared by oxyalkylating a traditional "monomeric" initiator molecule with one or more alkylene oxides to prepare a homopolymeric, or block, random, or block/random oligomer having an equivalent weight of from about 100 Da to about 1000 Da, preferably 200 Da to 500 Da. As such oligomers are normally prepared by traditional base catalysis, the alkylene oxides used may include ethylene oxide, propylene oxide, higher alkylene oxides such as 1,2- and 2,3-butylene oxide, styrene oxide, $C_5$-$C_{18}$ α-olefin oxides, and mixtures thereof. Ethylene oxide, mixtures of propylene oxide and ethylene oxide, and particularly propylene oxide alone, are preferred.

Suitable "monomeric" initiators which may be used as such for oxyalkylation, particularly with non-metal cyanide complex catalysts, or with double metal cyanide complex catalysts, preferably in the form of oxyalkylated oligomers, include but are not limited to, ethylene glycol, diethylene glycol, triethylene glycol, propylene glycol, dipropylene glycol, tripropylene glycol, neopentyl glycol, glycerine, trimethylolpropane, trimethylolethane, pentaerythritol, α-methylglucoside, sorbitol, mannitol, hydroxymethylglucoside, hydroxypropylglucoside, sucrose, N,N,N',N'-tetrakis[2-hydroxyethyl or 2-hydroxypropyl] ethylene diamine, 1,4-cyclohexanediol, cyclohexanedimethanol, hydroquinone, resorcinol, and the like. The initiator functionality is preferably from 2 to 8 or more, more preferably 2 to 6, and most preferably in the range of 2 to 4. Mixtures of monomeric initiators or their oxyalkylated oligomers may be used as well. Particularly preferred as the low primary hydroxyl polyols are glycerine initiated polyoxyalkylene polyols prepared by oxyalkylating glycerine or an oxypropylated glycerine initiator with a 1:3 to 3:1 mixture of propylene oxide and ethylene oxide. The polyols preferably have hydroxyl numbers ranging from 20 to about 60, more preferably 25 to 56, and most preferably about 25 to 35.

The polyol component preferably comprises one or more low primary hydroxyl, low unsaturation polyols without any additional high primary hydroxyl polyol. However, up to about 40 weight percent of the polyol component, preferably up to about 30 weight percent, exclusive of chain extenders and/or cross-linkers, if any, may be a conventional or low unsaturation, high primary hydroxyl polyol. By "high primary hydroxyl" polyol is meant a polyol having greater than 70 mol percent primary hydroxyl content. The polyol component as a whole, exclusive of chain extenders and/or cross-linkers, should have a nominal functionality of between about 2.2 and 6, preferably between 2.2 and 4, and most preferably in the range of 2.8 to 3.5.

The polyol component may contain a polymer polyol or polymer-modified polyol. Polymer polyols are dispersions of vinyl polymer in a polyoxyalkylene base polyol, while polymer-modified polyols are dispersions of non-vinyl solids, generally isocyanate-derived solids, in a polyoxyalkylene base polyol. Both polymer polyols, for example polyol dispersions of acrylonitrile/styrene particles, and polymer-modified polyols, for example PIPA and PHD polyols, are well known to those skilled in the art.

Preferably, such polymer polyols and polymer-modified polyols are prepared from low unsaturation polyoxyalkylene base polyols, preferably low unsaturation, low primary hydroxyl base polyols. The polymer polyols and polymer-modified polyols may have solids contents of from 5 to 50 weight percent, preferably 10 to about 45 weight percent. The amount of polymer polyol or polymer-modified polyol contained in the polyol component is such as to provide a total solids, based on the weight of total polyol component less chain extender and/or cross-linker, of from 0 to 25 weight percent, preferably 1 to 20 weight percent, and most preferably 5 to 15 weight percent.

Chain extenders and/or cross-linkers may be used when desired. Chain extenders include hydroxyl and amine functional molecules with nominal functionalities of two (a primary amine group is considered monofunctional) and having a molecular weight of less than about 300 Da. Non-limiting examples include ethylene glycol, diethylene glycol, propylene glycol, dipropylene glycol, tripropylene glycol, monoethanolamine, toluene diamine, and the electronically and sterically "hindered" aromatic amines such as the various ar-alkylated toluene diamines and methylenedianilines and substituted aromatic amines such as 4,4'-methylenebis(orthochloroaniline) (MOCA). Aliphatic glycol and mono- and dialkanolamine chain extenders are preferred.

Cross-linkers are nominally trifunctional or higher functionality molecules having molecular weights less than about 300 Da. Examples are glycerine, triethanolamine, and diethanolamine, the latter particularly preferred. Chain extenders and cross-linkers are used in conventional amounts, for example 5 parts or less based on 100 parts polyol component.

A foam stabilizing surfactant is generally necessary. Suitable surfactants are well known to those skilled in the art, and are available from Air Products, OSi, Wacker-Chemie, and Goldschmidt A.G.

A blowing agent is necessary. The blowing agent may be of the physical or reactive type. Physical blowing agents include lower alkanes, hydrofluorocarbons, perfluorocarbons, and the like. Chlorofluorocarbons are also useful but are not preferred due to environmental concerns. Preferred blowing agents are reactive blowing agents such as water, and liquid carbon dioxide, a physical blowing agent. The latter may be introduced into the foam mix head as a liquid. However, water is most preferred, in amounts of from about 1.5 to about 5 parts by weight relative to 100 parts polyol, preferably 2.5 to about 4 parts by weight on the same basis. Mixtures of physical and reactive blowing agents, for example water and one or more lower alkanes, or water and carbon dioxide, may also be used.

The isocyanate component may contain one or more di- or polyisocyanates or modified isocyanates. Non-limiting examples of suitable di- and polyisocyanates include 2,4- and 2,6-toluenediisocyanates, generally as a mixture of these isomers (TDI); 2,2'-, 2,4'-, and 4,4'-methylenediphenylene diisocyanates, generally as a mixture containing the 4,4'-isomer in major part (MDI); and polymethylene polyphenylene polyisocyanates prepared by the phosgenation of mixtures of predominately two to five ring condensation products of formaldehyde and aniline. Mixtures of such isocyanates are also suitable.

Modified isocyanates are well known to those skilled in the art, and include urea-, urethane-, carbodiimide-, allophanate-, uretonimine-, isocyanurate-, uretdione- and other modified isocyanates. Such isocyanates are prepared by reaction of a stoichiometric excess of isocyanate with an isocyanate reactive compound, for example a monomeric or oligomeric glycol to for murethane-modified isocyanates or water or a diamine to form urea-modified isocyanates, or by reaction of the isocyanate with itself by dimerization or trimerization. Modified isocyanates are commercially available. Preferred are urethane modified isocyanates and carbodiimide modified isocyanates.

The isocyanate component most preferably comprises TDI, MDI, or a mixture of TDI and MDI. The isocyanate component is supplied in an amount effective to provide an isocyanate index of from about 70 to about 130, preferably 90 to 115, and most preferably 95 to 105.

One or more catalysts are generally necessary. While both tin and amine-type catalysts may be used, it has been found that the subject formulations may be prepared in the absence of metal catalysts while still obtaining acceptable demold times of 5 minutes or less. Suitable metal catalysts are well known to those skilled in the art. Particularly preferred are tin catalysts such as stannous octoate, dibutyltin dilaurate, and dibutyltin diacetate. Amine catalysts are preferred. Suitable amine catalysts are well known to those skilled in the art, and include bis(2-dimethylaminoethyl)ether and triethylene diamine.

Having generally described this invention, a further understanding can be obtained by reference to certain specific examples which are provided herein for purposes of illustration only and are not intended to be limiting unless otherwise specified.

EXAMPLE 1 AND COMPARATIVE EXAMPLE C1

One-shot polyurethane foam formulations as presented in Table 1 were used to prepare cold molded polyurethane foams by introducing the foam formulation into a mold and foaming. Each foam formulation and the corresponding foam was separately prepared using the following procedure.

All of the above materials (except the isocyanate) were introduced into a mixing vessel and mixed at about 4,000 rpm for about 55 seconds. After mixing was stopped, isocyanate was quickly added and mixing was restarted and continued for about another 5 seconds. After mixing was stopped, the contents of the mixing vessel were immediately poured into a self-contained, air bag closure, aluminum mold (15"×15"×5") at a mold temperature of 160° F. A conventional mold release agent was used. The lid of the mold was immediately closed and latched and the air bag was inflated to quickly seal the mold. The foaming mixture in the mold was allowed to foam and fill the mold. The mold was fitted with 1/16" vents on all four corners and some foam extruded through these vents thereby expelling the air in the mold. The foam was allowed to set in the mold for 5 minutes—until cured enough to allow demolding. After setting, the air bag was deflated to relieve pressure in the mold and to allow mold declamping. The resulting polyurethane foam molded part was removed, crushed by passing it through crushing rollers (90%) to open the foam cells.

In Example 1, both the polyoxyalkylene polyol as well as the base polyol of the 40 weight percent styrene/acrylonitrile solids polymer polyol are low unsaturation (<0.010 meq/g), glycerine-initiated polyoxypropylene/polyoxyethylene random copolymer polyols having a total of 20% random oxyethylene moieties, a primary hydroxyl content of 30 mol percent, and a hydroxyl number of 35. The hydroxyl number of the polymer polyol is c.a. 20. In Comparative Example 1, a glycerine-initiated base-catalyzed polyol having an unsaturation of about 0.035 meq/g, containing 19.5 weight percent oxyethylene moieties as a cap and having 88 mol percent primary hydroxyl content is used. The same polyol is used as the base polyol for the polymer polyol, which contains 43 weight percent styrene/acrylonitrile solids and has a hydroxyl number of 20. The amount of polymer polyol in the two formulations are adjusted to provide the same solids content.

TABLE 1

| FOAM FORMULATION | Example C1 | Example 1 |
|---|---|---|
| High Primary OH Polyol[1] | 74.1 | — |
| High Primary OH Polymer Polyol[2] | 25.9 | — |
| Low Primary OH, Low Unsat. Polyol[3] | — | 72.2 |
| Low Primary OH, Low Unsat. Polymer Polyol[4] | — | 27.8 |
| Water | 3.00 | 3.00 |
| Diethanolamine | 1.00 | 1.00 |
| NIAX ® A-1 Catalyst (OSi Specialties, Inc.) | 0.10 | 0.10 |
| NIAX ® A-33 Catalyst (OSi Specialties, Inc.) | 0.50 | 0.50 |
| Y10,515 Silicone Surfactant (OSi Specialties) | 1.00 | 1.00 |
| TDI/MDI (80/20) Isocyanate Index | 100 | 100 |
| Foam Quality: | Good | Good |

[1]Glycerine started, KOH catalyzed, 35 OH polyol with approximately 19.5% EO (cap) and 88% primary OH.
[2]43% solids S/AN polymer polyol based on the polyol described in note 1, OH number ~ 20.
[3]Glycerine started, double metal cyanide complex-catalyzed, 35 OH polyol with approximately 18% random EO and 30% primary OH. EO was mixed-fed with PO at a ratio of (47/53). The polyol is not refined to remove residual catalyst.
[4]40% solids S/AN polymer polyol having a base polyol similar to that of note 3.

The results displayed in Table 1 indicate that the low primary hydroxyl, low unsaturation polyols of the subject invention unexpectedly are capable of producing good quality polyurethane foams. This result is especially surprising since the low primary hydroxyl polyols have only about one third the primary hydroxyl content of the conventional high primary hydroxyl polyols, yet produced a stable, good quality foam with acceptable demold time.

EXAMPLE 2 AND COMPARATIVE EXAMPLE C2

Polyurethane foams were prepared in a manner similar to Example 1 and Comparative Example C1 but employing TDI alone as the isocyanate. The formulations are presented in Table 2 below. As with the previous examples, the low primary hydroxyl, low unsaturation polyols produced a stable, good quality, foam despite the greatly disparate primary hydroxyl content.

TABLE 2

| FOAM FORMULATION | Example C2 | Example 2 |
|---|---|---|
| High Primary OH Polyol[1] | 74.10 | — |
| High Primary OH Polymer Polyol[2] | 25.9 | — |
| Low Primary OH, Low Unsat. Polyol[3] | — | 72.2 |
| Low Primary OH, Low Unsat. Polymer Polyol[4] | — | 27.8 |
| Water | 3.5 | 3.5 |
| NIAX ® A-1 Catalyst | 0.1 | 0.1 |
| NIAX ® A-33 Catalyst | 0.4 | 0.4 |
| Y-10,515 Silicone Surfactant | 1.5 | 1.5 |
| TDI Isocyanate Index | 100 | 100 |

[1]Glycerine started, KOH catalyzed, 35 OH polyol with approximately 19.5% EO (cap) and 88% primary OH.
[2]43% solids S/AN polymer polyol based on the polyol described in note 1, OH number ~ 20.
[3]Glycerine started, double metal cyanide complex-catalyzed, 35 OH polyol with approximately 18% random EO and 30% primary OH. EO was mixed-fed with PO at a ratio of (47/53). The polyol is not refined to remove residual catalyst.
[4]40% solids S/AN polymer polymol having a base polyol similar to that of note 3.

EXAMPLE 3 AND COMPARATIVE EXAMPLE 3

Foam formulations were prepared as in Example 1 and Comparative Example C1, but the high primary hydroxyl, high unsaturation, conventionally base-catalyzed polyol was replaced with a conventionally base-catalyzed, high unsaturation 20% oxyethylene-containing polyol having approximately 17.5 weight percent internal oxyethylene moieties, 2.5% as a cap, and having a 43% primary hydroxyl content. The formulations are presented in Table 3.

TABLE 3

| FOAM FORMULATION | Example 3 | Example C3 |
|---|---|---|
| Low Primary OH, Low Unsat. Polyol[5] | 72.2 | — |
| Low Primary OH, Low Unsat. Polymer Polylo[4] | 27.8 | 27.8 |
| Low Primary OH, High Unsat. Polyol | — | 72.2 |
| Water | 3.50 | 3.50 |
| Diethanolamine | 1.50 | 1.50 |
| NIAX ® A-1 | 0.08 | 0.08 |
| NIAX ® A-33 | 0.45 | 0.45 |
| Y-10,366 Surfactant (OSi Specialties) | 1.00 | 1.00 |
| 80/20 TDI/MDI, Isocyanate Index | 100 | 100 |
| Observations | Good Quality Foam | Total Collapse |

[4]Polyol of footnote 4 of Table 2.
[5]Polyol similar to the polyol described in footnote 3 of Table 2, having the same hydroxyl number, but containing 20 weight percent random EO.

The foam prepared from the base-catalyzed, high unsaturation, low primary hydroxyl polyol collapsed. Polyether polyols having high unsaturation and low primary hydroxyl content are not suitable for preparing cold-molded flexible polyurethane foam.

Having now fully described the invention, it will be apparent to one of ordinary skill in the art that many changes and modifications can be made thereto without departing from the spirit or scope of the invention as set forth herein.

What is claimed is:

1. A process for preparing cold-molded polyurethane flexible foam, comprising reacting:

a) one or more di- or polyisocyanates at an isocyanate index of from 70 to about 130; with b) a low primary hydroxyl polyol component comprising in substantial part one or more polyoxypropylene/polyoxyethylene random copolymers having an unsaturation of less than about 0.02 meq/g, and a primary hydroxyl content of less than 50 mol percent; and c) an effective amount of water as a blowing agent.

2. The process of claim 1 wherein said polyoxypropylene/polyoxyethylene random copolymer comprises in excess of about 70 weight of all polyoxyalkylene polyether polyol in said polyol component.

3. The process of claim 1 wherein said polyol component further comprises an amount of a polymer polyol and/or polymer modified polyol to provide a dispersed polymer solids content of from about 1 weight percent to about 25 weight percent based on the weight of the polyol component.

4. The process of claim 1 wherein at least one of said one or more polyoxypropylene/polyoxyethylene random copolymers has a primary hydroxyl content of less than about 35 mol percent.

5. The process of claim 1 wherein at least one of said one or more polyoxypropylene/polyoxyethylene random copolymers has an unsaturation of about 0.015 meq/g or less.

6. The process of claim 1 wherein said polyol component further comprises a high primary hydroxyl content polyoxypropylene/polyoxyethylene copolymer polyol, and wherein the average unsaturation of all low primary hydroxyl polyols is less than about 0.02 meq/g.

7. The process of claim 6 wherein the average unsaturation of all polyoxyalkylene polyols in said polyol component is less than about 0.02 meq/g.

8. The process of claim 6 wherein the average unsaturation of all polyoxyalkylene polyols in said polyol component is less than about 0.015 meq/g.

9. The process of claim 1 wherein said di- or polyisocyanate comprises TDI, MDI, or a mixture thereof.

10. A cold-molded polyurethane foam comprising the reaction product of:

a) one or more di- or polyisocyanates at an isocyanate index of from 70 to about 130; with b) a low primary hydroxyl polyol component comprising in substantial part one or more polyoxypropylene/polyoxyethylene random copolymers having an unsaturation of less than about 0.02 meq/g, and a primary hydroxyl content of less than 50 mol percent; and c) an effective amount of water as a blowing agent.

11. The cold molded polyurethane foam of claim 10 wherein said polyoxypropylene/polyoxyethylene random copolymer comprises in excess of about 70 weight of all polyoxyalkylene polyether polyol in said polyol component.

12. The cold molded polyurethane foam of claim 10 wherein said polyol component further comprises an amount of a polymer polyol and/or polymer modified polyol to provide a dispersed polymer solids content of from about 1 weight percent to about 25 weight percent based on the weight of the polyol component.

13. The cold molded polyurethane foam of claim 10 wherein at least one of said one or more polyoxypropylene/polyoxyethylene random copolymers has a primary hydroxyl content of less than about 35 mol percent.

14. The cold molded polyurethane foam of claim 10 wherein at least one of said one or more polyoxypropylene/polyoxyethylene random copolymers has an unsaturation of about 0.015 meq/g or less.

15. The cold molded polyurethane foam of claim 10 wherein said polyol component further comprises a high primary hydroxyl content polyoxypropylene/polyoxyethylene copolymer polyol, and wherein the average unsaturation of all low primary hydroxyl polyols is less than about 0.02 meq/g.

16. The cold molded polyurethane foam of claim 15 wherein the average unsaturation of all polyoxyalkylene polyols in said polyol component is less than about 0.02 meq/g.

17. The cold molded polyurethane foam of claim 15 wherein the average unsaturation of all polyoxyalkylene polyols in said polyol component is less than about 0.015 meq/g.

18. The cold molded polyurethane foam of claim 10 wherein said di- or polyisocyanate comprises TDI, MDI, or a mixture thereof.

19. A cold molded flexible polyurethane foam comprising the reaction product of an isocyanate component comprising TDI, MDI, or a mixture thereof, at an isocyanate index of from about 90 to about 110, with a polyol component comprising in substantial part one or more polyoxypropylene/polyoxyethylene copolymer polyols individually having an unsaturation of less than 0.02 meq/g and a primary hydroxyl content of 35 mol percent or less, said polyol component containing not more than 30% by weight of polyoxyalkylene polyols having a primary hydroxyl content of 70 mol percent or more.

20. The cold molded polyurethane foam of claim 19 wherein said polyol component comprises in excess of 90 weight percent of one or more polyoxypropylene/polyoxyethylene random copolymer polyols, said polyol component having an average unsaturation of less than about 0.015 meq/g and an average primary hydroxyl content of 35 mol percent or less.

* * * * *